United States Patent [19]  [11]  4,450,254
Isley et al.  [45]  May 22, 1984

[54] IMPACT IMPROVEMENT OF HIGH NITRILE RESINS

[75] Inventors: Ralph E. Isley, Northfield; Dorothy C. Prem, Sagamore Hills; June T. Duke, Chagrin Falls, all of Ohio

[73] Assignee: Standard Oil Company, Cleveland, Ohio

[21] Appl. No.: 392,392

[22] Filed: Jun. 25, 1982

Related U.S. Application Data

[63] Continuation of Ser. No. 203.022, Nov. 3, 1980, abandoned.

[51] Int. Cl.$^3$ ................................................ C08K 5/09
[52] U.S. Cl. .................................... 524/399; 524/400; 524/523; 525/227
[58] Field of Search ............... 524/394, 399, 400, 523, 524/534

[56] References Cited

U.S. PATENT DOCUMENTS

| | | | |
|---|---|---|---|
| 3,426,102 | 2/1969 | Solak | 525/230 |
| 3,580,974 | 5/1971 | Lee | 525/72 |
| 3,922,320 | 11/1975 | Love | 524/534 |
| 4,000,106 | 12/1976 | Isley | 524/534 |
| 4,043,947 | 8/1977 | Talsma | 524/114 |
| 4,102,947 | 7/1978 | Budinger | 525/310 |
| 4,292,228 | 9/1981 | Isley | 525/310 |

Primary Examiner—C. A. Henderson
Attorney, Agent, or Firm—Debra L. Pawl; David J. Untener; Larry W. Evans

[57]  ABSTRACT

The impact resistance of high nitrile thermoplastic resins is greatly improved by including metal carboxylate compounds therein. Examples of metal carboxylate compounds useful herein include calcium stearate, calcium pelargonate, calcium laurate, zinc laurate, zinc stearate, aluminum distearate, aluminum laurate and aluminum pelargonate.

6 Claims, No Drawings

IMPACT IMPROVEMENT OF HIGH NITRILE RESINS

This is a continuation of application Ser. No. 203,022 filed Nov. 3, 1980, now abandoned.

This invention relates to high nitrile thermoplastic resins with improved impact strength and more particularly pertains to the inclusion of metal carboxylate compounds in high nitrile thermoplastic resins for the purpose of improving the processability and impact strength of said resins.

The metal carboxylate compound most useful in this invention can be represented by the following formula:

R—COOM wherein R is selected from the group consisting of aliphatic hydrocarbons containing at least six carbon atoms; and M is a metal.

Preferably, R contains at least 8 but not more than 19 carbon atoms and M is a metal with an atomic weight less than 120. Preferred metal carboxylates include stearates, laurates and pelargonates of calcium, aluminum and zinc.

These metal carboxylate compounds are easily formed by reacting a carboxylic acid with a metal. If desired, this reaction can take place in situ. These impact improvers are dispersed in a weight ratio within the range of from about 1 to 20 parts by weight and preferably from about 1 to 10 parts by weight based on 100 parts by weight of the high nitrile thermoplastic resin.

The high nitrile thermoplastic resin embodied herein can be prepared by any of the known general techniques for polymerization including the bulk polymerization, solution polymerization and emulsion or suspension polymerization techniques by batch, continuous or intermittent addition of the monomers and other components. The preferred method is emulsion polymerization. The polymerization is preferably carried out in an aqueous medium in the presence of an emulsifier and a free radical generating polymerization initiator at a temperature of from 0° to 100° C. in the substantial absence of molecular oxygen.

These resins are produced by polymerizing a major proportion of a monounsaturated nitrile, such as acrylonitrile and a minor proportion of another monovinyl monomer component copolymerizable therewith, optionally in the presence of a diene rubber which may be a homopolymer or copolymer of a conjugated diene monomer.

The monounsaturated nitriles most useful in the present invention are the alpha, beta-olefinically unsaturated mononitriles having the structure:

$$CH_2=C-CN$$
$$\quad\ |$$
$$\quad\ R$$

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile, and the like. The most preferred monounsaturated nitriles useful in the present invention are acrylonitrile and methacrylonitrile and mixtures thereof.

The monovinyl monomer component copolymerizable with said monounsaturated nitrile includes one or more of the esters of olefinically unsaturated carboxylic acids, vinyl esters, vinyl ethers, vinyl ketones, alpha-olefins, vinyl aromatic monomers and others.

The esters of olefinically unsaturated carboxylic acids include those having the structure:

$$CH_2=C-COOR_2$$
$$\quad\ |$$
$$\quad\ R_1$$

wherein $R_1$ is hydrogen, an alkyl group having from 1 to 30 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, the hexyl acrylates, methyl methacrylate, ethyl methacrylate, the propyl methacrylates, the butyl methacrylates, the amyl methacrylates, and the hexyl methacrylates, methyl alpha-chloroacrylates, ethyl alpha-chloroacrylates and the like. Most preferred in the present invention are methyl acrylate, ethyl acrylate, methyl methacrylate and ethyl methacrylate.

The alpha-olefins useful in the present invention are those having at least 4 and as many as 10 carbon atoms having the structure:

$$CH_2=C\begin{matrix}R_3\\ \\R_4\end{matrix}$$

wherein $R_3$ and $R_4$ are alkyl groups having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethyl butene-1, 2-propyl pentene-1 and the like. Most preferred is isobutylene.

The vinyl ethers include methyl vinyl ether, ethyl vinyl ether, propyl vinyl ethers, the butyl vinyl ethers, methyl isopropanyl ether, ethyl isopropanyl ether and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates and the like. Most preferred is vinyl acetate.

The vinyl aromatic monomers include styrene, alpha-methyl styrene, the vinyl toluenes, the vinyl xylenes and the like. Most preferred is styrene.

As discussed above, the instant polymeric system may optionally include preformed diene rubber which can be a homopolymer or copolymer of a conjugated diene monomer. The conjugated diene monomers useful in the present invention include butadiene-1,3, isoprene, chloroprene, bromoprene, cyanoprene, 2,3-dimethyl butadiene-1,3, 2-ethyl butadiene-1,3, 2,3-diethyl butadiene-1,3, and the like. Most preferred for the purposes of this invention are butadiene-1,3 and isoprene because of their ready availability and their excellent polymerization properties. These conjugated diene monomers can be copolymerized with the monovinyl monomer component described above.

Preferably, the nitrile copolymer used in this invention is prepared by the polymerization of 100 parts by weight of (A) from 60 to 90% of:

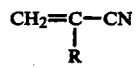

wherein R has the foregoing designation, and (B) from 10 to 40% by weight based on the combined weights of (A) and (B) of at least one member selected from the group consisting of (1) an ester having the structure:

$$CH_2=C-COOR_2$$
$$|$$
$$R_1$$

wherein $R_1$ and $R_2$ have the foregoing respective designations, (2) an alpha-olefin having the structure:

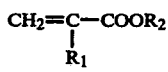

wherein $R_3$ and $R_4$ have the foregoing respective designations, (3) a vinyl ether selected from the group consisting of methyl vinyl ether, ethyl vinyl ether, the propyl vinyl ethers, and the butyl vinyl ethers, (4) vinyl acetate, (5) styrene and (6) indene. These nitrile copolymers are in the presence of from 0 to 40 parts by weight of (C) a rubbery copolymer of a conjugated diene monomer selected from the group consisting of butadiene and isoprene and optionally at least one comonomer selected from the group consisting of styrene, a nitrile monomer having the structure:

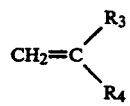

wherein R has the foregoing designation, and an ester having the structure:

$$CH_2=C-COOR_2$$
$$|$$
$$R_1$$

wherein $R_1$ and $R_2$ have the foregoing respective designations, said rubbery polymer containing from 50 to 100% by weight of polymerized conjugated diene and from 0 to 50% by weight of a comonomer.

More preferred copolymers are prepared by the polymerization of at least 70 parts by weight of (A) and less than 30 parts by weight of (B). It is also preferable to include between 5 to 15 parts by weight of (C).

The impact improvers can be dispersed in the high nitrile resins in any one of a number of ways which are well known to those skilled in the art. For example, these impact improvers an be melt compounded into the resin or the acid can be emulsified and co-coagulated with the nitrile latex using a metal salt, e.g. alum.

The high nitrile resins useful in the process for this invention can also contain compounding ingredients and additives, pigments, colorants, stabilizers, etc., as is well known in the art, so long as the balance between impact strength, flexural strength, tensile strength, processability, heat distortion temperature, and the like, is not affected to such a degree that the article is no longer useful for its intended purpose. The polymers useful in the instant process are thermoplastic materials which are easily processed and can be thermoformed into a wide variety of useful articles in any of the conventional ways employed with well known thermoplastic polymeric materials such as by extrusion, milling, molding, drawing, blowing, etc. These polymers have excellent solvent resistance, including water frost resistance, and their impact strength and low permeability to gases and vapors make them very useful in the packaging industry. They are also particularly useful in the manufacture of bottles, films, envelopes, boxes and other types of containers for liquids and solids.

In the following examples, which will further illustrate the invention, the amounts of the various ingredients are given in parts by weight unless otherwise specified.

COMPARATIVE EXAMPLE A

A. A rubber latex was prepared by polymerizing with continuous agitation at 45° C. in the substantial absence of oxygen a mixture of the following ingredients:

| Ingredients | Parts |
| --- | --- |
| Acrylonitrile | 40.0 |
| Butadiene-1,3 | 60.0 |
| Emulsifier (GAFAC RE-610)* | 2.4 |
| Azobisisobutyronitrile | 0.3 |
| t-Dodecyl Mercaptan | 0.5 |
| Water | 200.0 |

*A mixture of $R-O-(CH_2CH_2O-)_nPO_3M_2$ and $[R-O-(CH_2CH_2O-)_n]_2PO_2M$ wherein n is a number from 1 to 40, R is an alkyl or alkaryl group and preferably a non-phenyl group, and M is hydrogen, ammonia or an alkali metal, which composition is sold by GAF Corporation.

Before the reaction was started, the pH of the mixture was adjusted to about 8 with KOH. The polymerization was carried out for 22¼ hours to a conversion of about 92% and a total solids of about 33.1%.

An impact resistant, gas barrier resin was prepared by polymerization of a mixture of the following ingredients:

| Ingredients | Parts |
| --- | --- |
| Acrylonitrile | 75.0 |
| Methyl Acrylate | 25.0 |
| Rubber Latex (above) | 9.0 |
| Potassium Persulfate | 0.06 |
| Emulsifier (GAFAC RE-610) | 3.0 |
| Modifier n-Dodecyl Mercaptan | 1.0 |
| Ethylene diamine tetra-acetic acid | 0.05 |
| Water | 200.0 |

The pH was adjusted to about 7 with $NH_4OH$. The polymerization was carried out in the substantial absence of oxygen at 60° C. for 5 hours so as to produce a conversion of 91% of a latex. The latex obtained from the polymerization was then coagulated and the resin was dried and compression molded into a bar at 150° C. This molded bar was found to have a notched izod impact strength of 1.28 ft. lb./in.

EXAMPLES 1 THRU 10

Samples of the resin described in Comparative Example A were blended with various metal carboxylates in a Banbury mixer. The blends were compression molded into test bars and notched izod impact values were determined on the bars. The following results were obtained:

TABLE I
Blends of High Nitrile Resin with Metal Carboxylate

| Example | Metal Carboxylate | % By Weight | Notched Izod (Ft. Lb./In.) |
|---|---|---|---|
| A | — | 0 | 1.28 |
| 1 | Calcium Pelargonate | 1 | 8.67 |
| 2 | Calcium Laurate | 1 | 6.00 |
| 3 | Calcium Stearate | 1 | 3.96 |
| 4 | Zinc Laurate | 1 | 6.91 |
| 5 | Zinc Stearate | 1 | 7.63 |
| 6 | Aluminum Pelargonate | 1 | 5.03 |
| 7 | Aluminum Laurate | 1 | 7.29 |
| 8 | Aluminum Distearate | 1 | 6.05 |
| 9 | Aluminum Pelargonate | 2 | 6.99 |
| 10 | Aluminum Pelargonate | 3 | 6.12 |

EXAMPLES 11 THRU 14

The procedure of Comparative Example A was repeated except that carboxylic acids were emulsified as part of the stabilizer package and then co-coagulated with the latex using alum. A metal carboxylate is formed in situ. The resin was then compression molded into test bars and the notched izod impact values were determined. The results are shown in Table II.

TABLE II
High Nitrile Resins with Metal Carboxylates Formed In Situ

| Example | Carboxylic Acid | Metal Carboxylate | % By Weight | Notched Izod (Ft. Lb./In.) |
|---|---|---|---|---|
| 11 | Oleic | Aluminum Oleate | 1 | 2.00 |
| 12 | Oleic | Aluminum Oleate | 2 | 2.47 |
| 13 | Oleic | Aluminum Oleate | 3 | 4.73 |
| 14 | Lauric | Aluminum Laurate | 2 | 2.41 |

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims:

We claim:

1. An impact resistant resin composition which comprises an intimate mixture of (1) a copolymer produced by the polymerization of a major proportion of a monounsaturated nitrile and a minor proportion of at least one monovinyl monomer component copolymerizable therewith in the presence of a preformed diene rubber; and (2) a metal carboxylate selected from the group consisting of calcium pelargonate, calcium laurate, aluminum pelargonate, aluminum laurate and aluminum distearate.

2. The composition of claim 1 wherein the copolymer comprises (A) from 60 to 90 percent by weight of at least one nitrile having the structure:

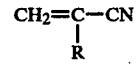

wherein R is hydrogen, a lower alkyl group having from 1 to 4 carbon atoms, or a halogen, and (B) from 10 to 40 percent by weight based on the combined weight of (A) and (B) of at least one member selected from the group consisting of (1) an ester having the structure:

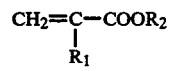

wherein $R_1$ is hydrogen, an alkyl group having from 1 to 30 carbon atoms, or halogen, and $R_2$ is an alkyl group having from 1 to 6 carbon atoms, (2) an alpha-olefin having the structure:

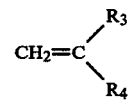

wherein $R_3$ and $R_4$ are alkyl groups having from 1 to 7 carbon atoms, (3) a vinyl ether selected from the group consisting of methyl vinyl ether, ethyl vinyl ether, the propyl vinyl ethers and the butyl vinyl ethers, (4) vinyl acetate, (5) styrene, and (6) indene, in the presence of from 0 to 40 parts by weight of (C) a rubber polymer of a conjugated diene monomer selected from the group consisting of butadiene and isoprene and a comonomer selected from the group consisting of styrene, a monomer having the structure:

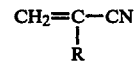

wherein R has the foregoing designation, and an ester having the structure:

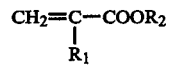

wherein $R_1$ and $R_2$ have the foregoing respective designations, said rubber polymer containing from 50 to 100 percent by weight of polymerized conjugated diene and from 0 to 50 percent by weight of a comonomer.

3. The composition of claim 2 wherein (A) is acrylonitrile.

4. The composition of claim 2 wherein (B) is methyl acrylate.

5. The composition of claim 2 wherein (B) is styrene.

6. The composition of claim 2 which contains more than 70 percent of (A) and less than 30 percent of (B).

* * * * *